United States Patent [19]

Zambounis et al.

[11] Patent Number: 5,755,875
[45] Date of Patent: May 26, 1998

[54] FLUORESCENT CHROMOPHORES CONTAINING CYANIMINO GROUPS

[75] Inventors: John S. Zambounis, Murten; Zhimin Hao, Marly; Abul Iqbal, Arconciel, all of Switzerland

[73] Assignee: Ciba Specialty Chemicals Corporation, Tarrytown, N.Y.

[21] Appl. No.: 621,761

[22] Filed: Mar. 22, 1996

Related U.S. Application Data

[62] Division of Ser. No. 407,743, Mar. 21, 1995, abandoned.

[30] Foreign Application Priority Data

Mar. 25, 1994 [CH] Switzerland ............ 00 916/94

[51] Int. Cl.$^6$ .............. C08K 5/00; C08J 5/34; C08J 5/45; C07D 209/44
[52] U.S. Cl. .............. 106/498; 524/84; 524/87; 524/89; 524/93; 524/789; 524/794; 548/306.4; 548/308.7; 548/433; 548/455; 548/457; 548/470; 548/472; 549/52; 549/57
[58] Field of Search .............. 548/306.4, 308.7, 548/433, 455, 457, 470, 472; 8/637.1, 639, 648; 549/52, 57; 534/789, 794; 524/84, 87, 89, 93; 106/498

[56] References Cited

U.S. PATENT DOCUMENTS

| | | | |
|---|---|---|---|
| 3,340,264 | 9/1967 | Walker | 260/281 |
| 4,115,404 | 9/1978 | Greenhalgh | 260/343.3 R |
| 4,316,023 | 2/1982 | Henning et al. | 544/300 |
| 4,492,796 | 1/1985 | Lorenz | 548/471 |

FOREIGN PATENT DOCUMENTS

| | | |
|---|---|---|
| 0017214 | 10/1980 | European Pat. Off. |
| 0042531 | 6/1981 | European Pat. Off. |
| 04338761 | 11/1992 | Japan. |

OTHER PUBLICATIONS

El–Hosseni MS, Hassan HM, Fadda AA, Habib OMO. Indian J. Chem., Sect. B, 23B (11), 1119–21, 1984.
Setune J, Wakemoto H, Matsueda T, Matsuura T, Tajima H, Kitao T, Ishihara S, Yamamoto R. J. Chem. Soc., Perlom Trans. 1 (10), 2305–9, 1984.
S. Hünig, et al., Angew. Chem. 96, 437(1984).
S. Hunig, et al., Angew Chem. 102, 220(1990).

*Primary Examiner*—C. Warren Ivy
*Assistant Examiner*—Evelyn Huang
*Attorney, Agent, or Firm*—Kevin T. Mansfield; Michele A. Kovaleski

[57] ABSTRACT

Compounds selected from the series consisting of the perylenecarboximide, quinacridone, isoindoline, indigoid, azo, benzodipyrrolone, benzodifuranone, furanofuran, pyrrolo[2,5-b]pyrrole and bianthraquinone chromophores containing at least one grouping of formula $$\overset{A}{\underset{-C}{\overset{\|}{C}}}{-}\!\!\left(\!\!\begin{array}{c}H\\C\\\|\\C\\H\end{array}\!\!\right)_{\!\!m}\!\!\!-\!X\!\!-\!(\!C\!\!-\!)_{\!\overline{n}},\quad\text{(I)}$$

wherein each A may be N—CN or O, with the proviso that at least one A must be N—CN, X is —N(R)—, —O— or —S—, R is hydrogen, $C_1$–$C_{18}$alkyl, unsubstituted or halogen- or $C_1$–$C_4$alkyl-substituted phenyl, benzyl or phenethyl, and m and n are each independently of the other 0 or 1.

Depending on the nature of their substituents, these compounds can be used as polymer-soluble dyes or as pigments for coloring high molecular weight organic material. They are distinguished by a surprisingly high solid-state fluorescence.

6 Claims, No Drawings

FLUORESCENT CHROMOPHORES CONTAINING CYANIMINO GROUPS

This is a divisional of Ser. No. 08/407,743, filed Mar. 21, 1995 abandoned.

The present invention relates to novel chromophores containing cyanimino groups, to a process for their preparation and to the use thereof for colouring organic material of high molecular weight.

EP 17 214 discloses chromophores which are prepared by a two-step process by condensation of diiminoisoindoline with a cyanoacetamide and then with cyanobarbiturimide. This method, however, cannot be used for the preparation of cyanimino derivatives of high-performance pigments, as in the synthesis of these pigments either at least some of the cyanimino groups would enter into unwanted reactions, for example hydrolysis, or the synthesis of the pigments would be hindered by the presence of the cyanimido group or even made impossible.

In Angew. Chem. 96, 437, 1984 and 102, 220, 1990, S. Hünig et al. describe a method for converting soluble ketones and thiolactones into corresponding N-cyanimines. Surprisingly, it has now been found that also insoluble pigments which contain at least one nitrogen atom with a direct adjacent or conjugated carbonyl group, typically including the known pigments of the perylenecarboximide, quinacridone, isoindoline, indigoid, azo, benzodipyrrolone, benzodifuranone, furanofuran, pyrrolopyrrole and bianthraquinone series, can be converted in analogous manner in good yield.

Starting from widely available and readily accessible high-performance pigments which contain one or more than one oxo group, the invention provides a general method of preparing the corresponding cyanimino derivatives. Very surprisingly, the novel products so obtained are distinguished by an unexpectedly high solid-state fluorescence.

Accordingly, the present invention relates to compounds selected from the series consisting of the perylenecarboximide, quinacridone, isoindoline, indigoid, azo, benzodipyrrolone, benzodifuranone, furanofuran, pyrrolo[2,5-b]pyrrole and bianthraquinone chromophores containing at least one grouping of formula

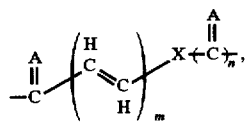

(I)

wherein each A may be N—CN or O, with the proviso that at least one A must be N—CN, X is —N(R)—, —O— or —S—, R is hydrogen, $C_1$-$C_{18}$alkyl, unsubstituted or halogen- or $C_1$-$C_4$alkyl-substituted phenyl, benzyl or phenethyl, and m and n are each independently of the other 0 or 1.

The perylenecarboximide, quinacridone, isoindoline, indigoid, azo, benzodipyrrolone, benzodifuranone, furanofuran, pyrrolopyrrole and bianthraquinone chromophores are pigments of known basic structure, typically

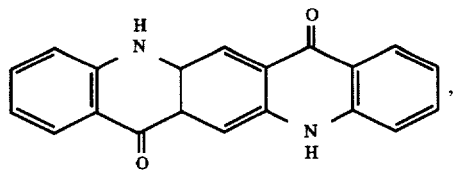

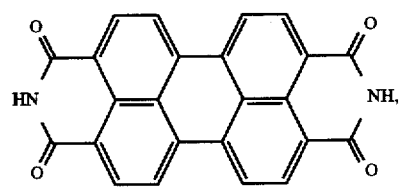

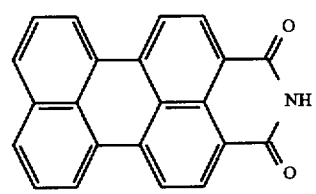

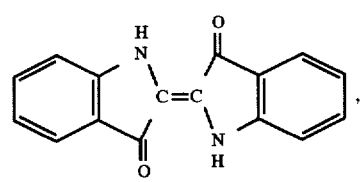

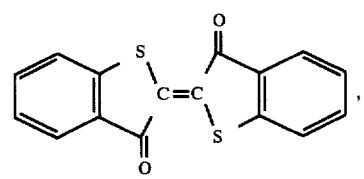

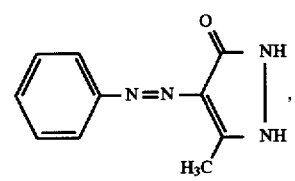

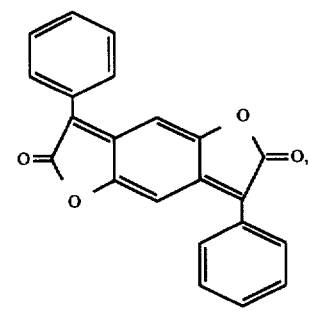

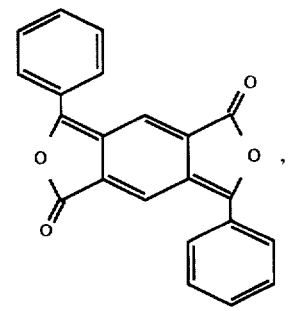

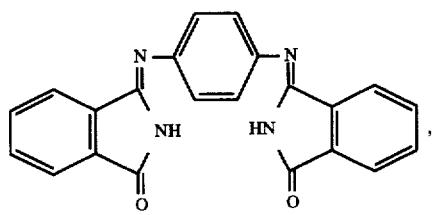
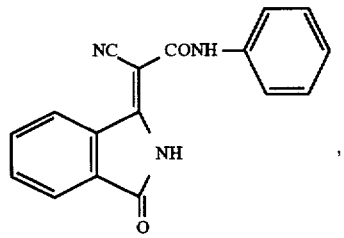
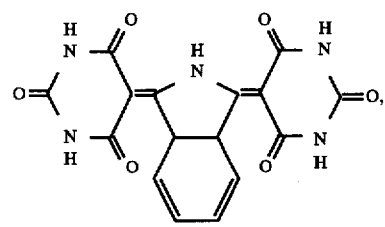
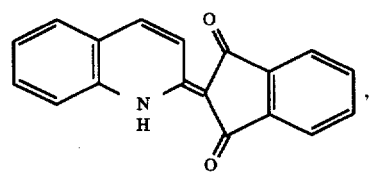
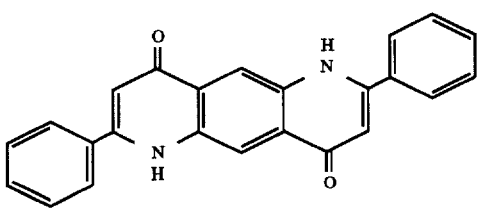
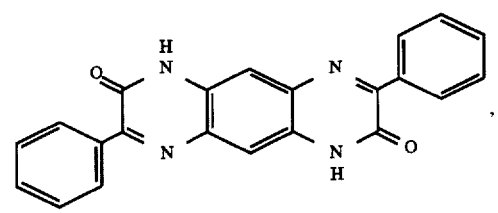
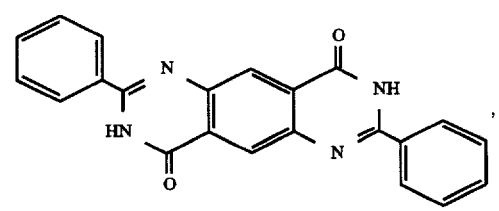
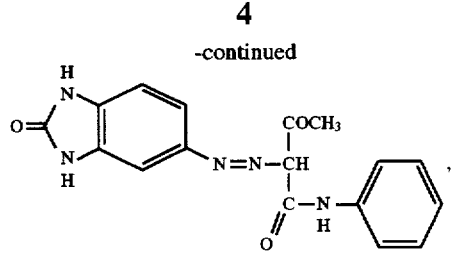
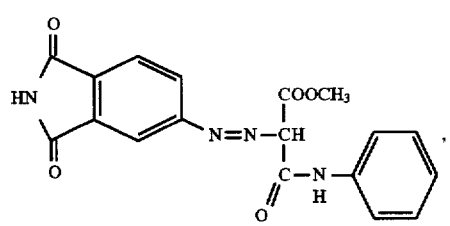
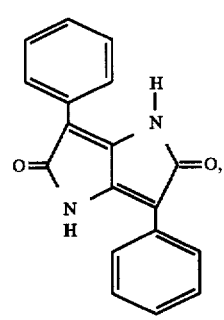
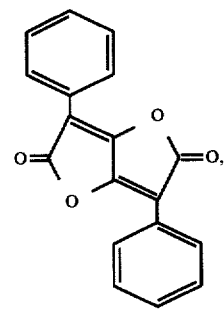
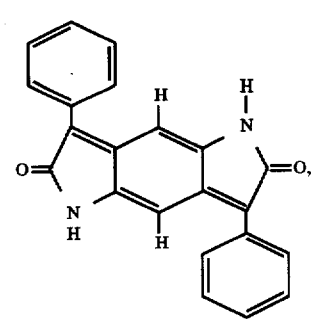
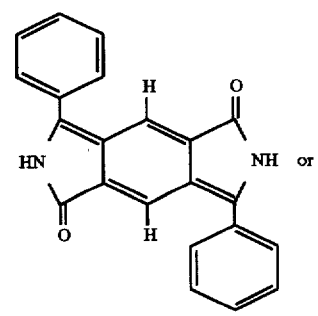 or

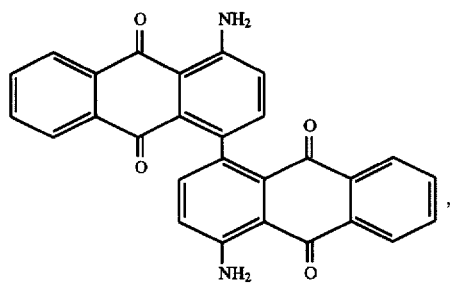

or the derivatives thereof which carry one or more than one substituent selected from the group consisting of halogen, alkyl, alkoxy or alkylamino, e.g. $C_1$–$C_{18}$alkyl, $C_1$–$C_4$alkoxy or $C_1$–$C_6$alkylamino.

Halogen substituents will typically be taken to mean iodo, fluoro, preferably bromo and, most preferably, chloro.

$C_1$–$C_4$Alkyl substituents will typically be methyl, ethyl, n-propyl, isopropyl, n-butyl, sec-butyl, tert-butyl; $C_1$–$C_6$alkyl will additionally be taken to mean n-amyl, tert-amyl, hexyl; and $C_1$–$C_{18}$alkyl will additionally be taken to mean heptyl, octyl, 2-ethylhexyl, nonyl, decyl, dodecyl, tetradecyl, hexadecyl or octadecyl.

$C_1$–$C_4$Alkoxy will typically be methoxy, ethoxy, n-propoxy, isopropoxy, n-butoxy or tert-butoxy.

$C_1$–$C_6$Alkylamino is typically methylamino, ethylamino, propylamino or hexylamino.

X in formula I is preferably —N(R)—, wherein R is as defined above.

Preferred compounds of this invention are:

a) Perylenecarboximides of formula

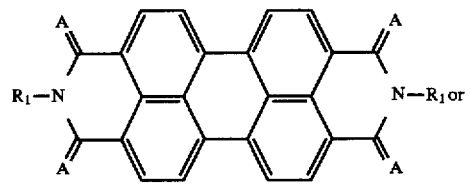

(IIa)

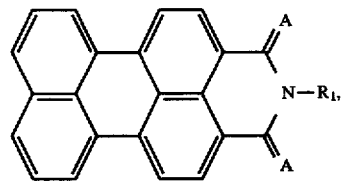

(IIb)

wherein $R_1$ is hydrogen, $C_1$–$C_6$alkyl, unsubstituted or halogen- or $C_1$–$C_4$alkyl-substituted phenyl, benzyl or phenethyl, and A is as defined above, b) quinacridones of formula

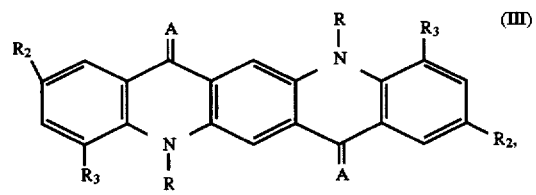

(III)

wherein $R_2$ and $R_3$ are each independently of the other hydrogen, halogen, $C_1$–$C_{18}$alkyl, $C_1$–$C_4$alkoxy or phenyl, and A and R are as defined above, c) isoindolines of formula

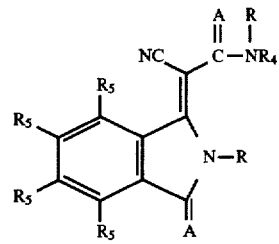

(IV)

or

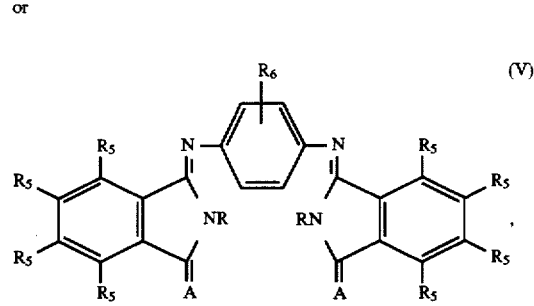

(V)

wherein $R_4$ is a group

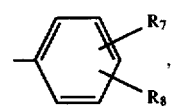

$R_5$ is hydrogen or chloro,
$R_6$ is hydrogen, methyl or chloro.
$R_7$, $R_8$, $R_9$ and $R_{10}$ are each independently of one another hydrogen, $C_1$–$C_{18}$alkyl, $C_1$–$C_4$alkoxy, halogen or trifluoromethyl, and A and R are as defined above.

d) indigo derivatives of formula

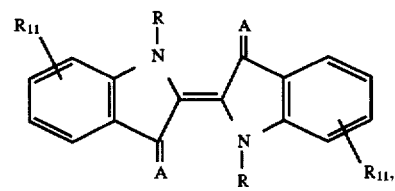

(VIa)

or

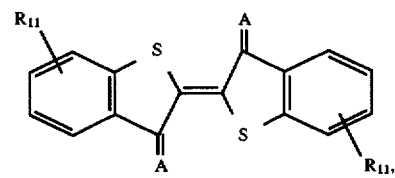

(VIb)

wherein $R_{11}$ is hydrogen, CN, $C_1$–$C_4$alkyl, $C_1$–$C_4$alkoxy or halogen, and A and R are as defined above.

e) azobenzimidazolones of formula

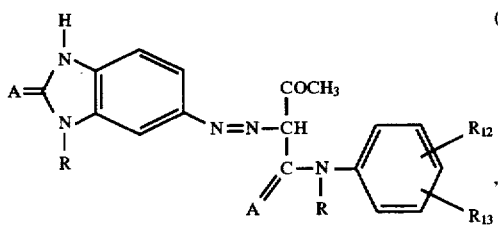
(VII)

wherein $R_{12}$ and $R_{13}$ are each independently of the other hydrogen, halogen, $C_1$–$C_4$alkyl or $C_1$–$C_4$alkoxy,
and A and R are as defined above.

f) benzodipyrrolones of formula

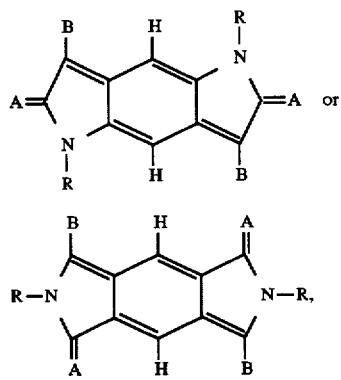
(VIIIa)

(VIIIb)

wherein B is a group of formula

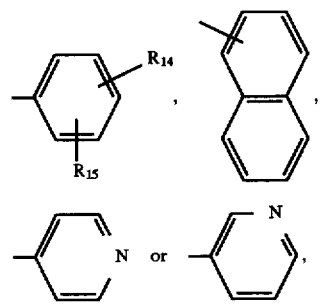

wherein $R_{14}$ and $R_{15}$ are each independently of the other hydrogen, chloro, bromo, $C_1$–$C_4$alkyl, $C_1$–$C_4$alkoxy, $C_1$–$C_6$alkylamino, CN or phenyl,
and A and R are as defined above.

g) benzodifuranones of formula

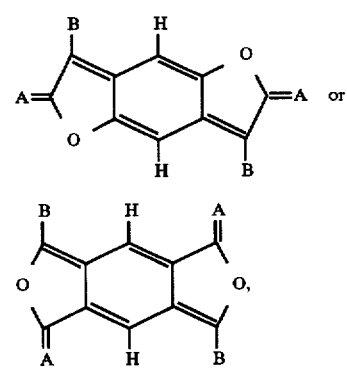
(IXa)

(IXb)

wherein A and B are as defined above.

h) pyrrolo[2,5-b]pyrroles of formula

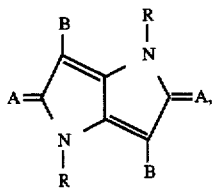
(X)

wherein B is a group of formula

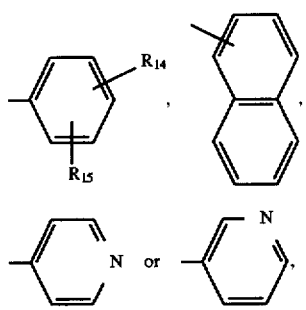

wherein $R_{14}$ and $R_{15}$ are each independently of the other hydrogen, chloro, bromo, $C_1$–$C_4$alkyl, $C_1$–$C_4$alkoxy, $C_1$–$C_6$alkylamino, CN or phenyl,
and A and R are as defined above, or j) bianthraquinoids of formula

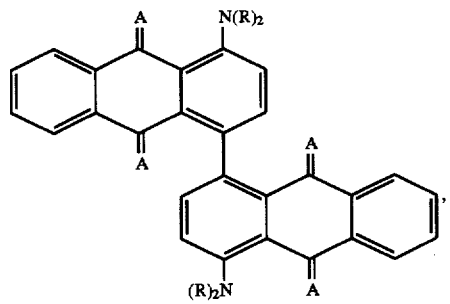
(XI)

wherein A and R are as defined above.
Particularly preferred pigments are
1) perylenecarboximides of formula

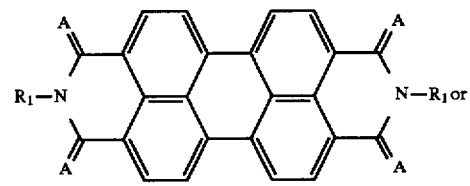
(IIa)

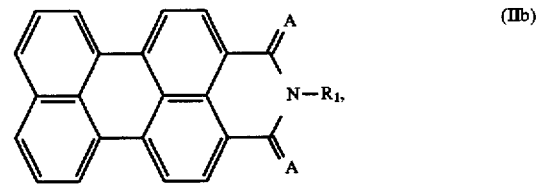
(IIb)

wherein $R_1$ is hydrogen, $C_1$–$C_6$alkyl, unsubstituted or halogen- or $C_1$–$C_4$alkyl-substituted phenyl, benzyl or phenethyl, and A is as defined above.

2) quinacridones of formula

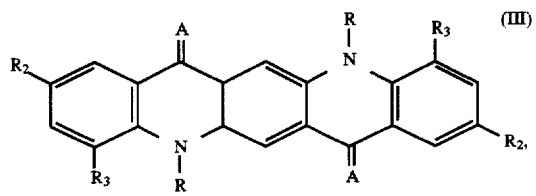 (III)

wherein $R_2$ and $R_3$ are each independently of the other hydrogen, halogen, $C_1$–$C_{18}$alkyl, $C_1$–$C_4$alkoxy or phenyl, and A and R are as defined above.

3) isoindolines of formula

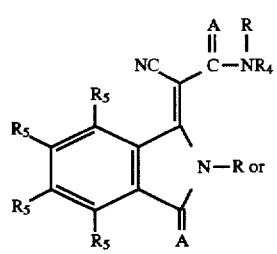 (IV)

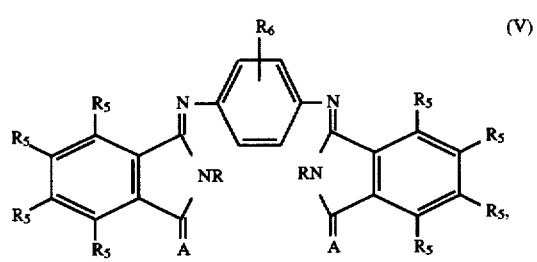 (V)

wherein $R_4$ is a group

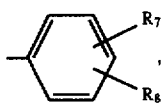, $R_5$ is hydrogen or chloro, $R_6$ is hydrogen, methyl or chloro, $R_7$, $R_8$, $R_9$ and $R_{10}$ are each independently of one another hydrogen, $C_1$–$C_{18}$alkyl, $C_1$–$C_4$alkoxy, halogen or trifluoromethyl, and A and R are as defined above.

4) indigo derivatives of formula

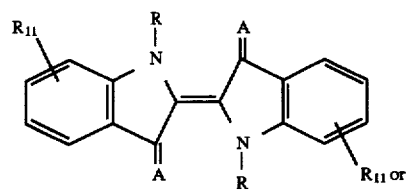 (VIa)

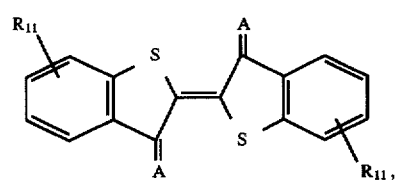 (VIb)

wherein $R_{11}$ is hydrogen, CN, $C_1$–$C_4$alkyl, $C_1$–$C_4$alkoxy or halogen, and A and R are as defined above.

5) bianthraquinoids of formula

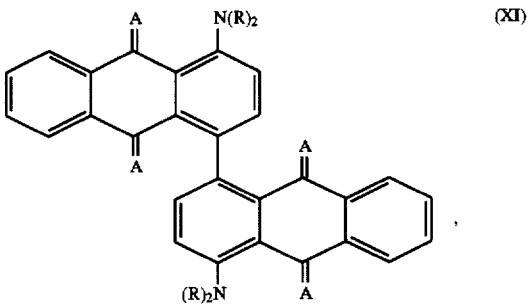 (XI)

wherein A and R are as defined above, and, in particular, i) perylenecarboximides of formula

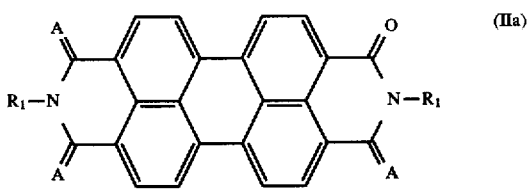 (IIa)

or

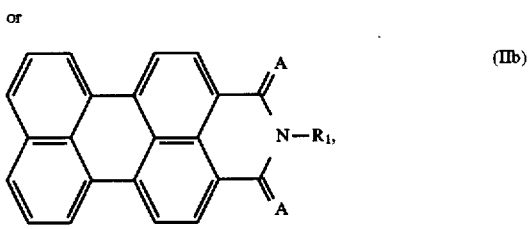 (IIb)

wherein $R_1$ is hydrogen, $C_1$–$C_6$alkyl, unsubstituted or halogen- or $C_1$–$C_4$alkyl-substituted phenyl, and A is as defined above.

ii) quinacridones of formula

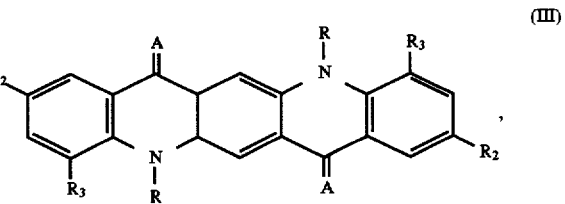 (III)

wherein $R_2$ and $R_3$ are each independently of the other hydrogen, halogen, $C_1$–$C_4$alkyl, $C_1$–$C_4$alkoxy or phenyl, and A and R are as defined above, or iii) indigo derivatives of formula

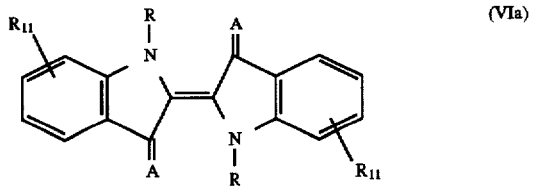 (VIa)

or

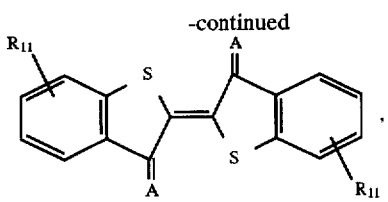

(VIb)

wherein $R_{11}$ is hydrogen, $C_1$–$C_4$alkyl, $C_1$–$C_4$alkoxy or halogen, and A and R are as defined above.

The compounds of this invention are prepared by reacting a compound selected from the series consisting of the perylenecarbodiimide, quinacridone, isoindoline, indigoid, azo, benzodipyrrolone, benzodifuranone, furanofuran, pyrrolo[2,5-b]pyrrole and bianthraquinone pigments containing at least one grouping of formula

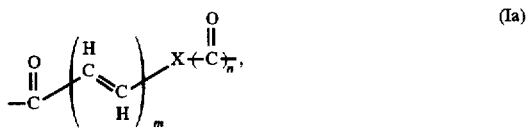

(Ia)

wherein X is —N(R)—, —O— or —S—, R is hydrogen, $C_1$–$C_{18}$alkyl, unsubstituted or halogen- or $C_1$–$C_4$alkyl-substituted phenyl, benzyl or phenethyl, and n are each independently of the other 0 or 1, in the desired molar ratio, with a compound of formula

(XII)

or

(XIII)

wherein $R_{16}$ is $C_1$–$C_6$alkyl, in the presence of a Lewis acid as catalyst and in an aprotic organic solvent, in the temperature range from 10° to 150° C., preferably from 50° to 100° C. The reaction time will vary in accordance with the starting material from about 30 minutes to about 200 hours.

As already mentioned, the method described by Hünig et al. relates solely to the reaction of soluble starting materials. That the reaction would also be able to proceed so successfully starting from insoluble pigments was not to be expected. Accordingly, the invention also relates to this novel process.

The compound XII or XIII supplying the cyanimino groups is preferably used in about a 10- to 20-fold excess, based on the pigment.

A Lewis acid which may suitably be used as catalyst is typically CsF, $BF_3$, $ZrCl_4$ and, preferably, $TiCl_4$.

Suitable solvents are typically ethers such as tetrahydrofuran or dioxane, or glycol ethers such as ethylene glycol methyl ether, ethylene glycol ethyl ether, diethylene glycol monomethyl ether or diethylene glycol monoethyl ether, and also dipolar aprotic solvents such as acetonitrile, benzonitrile, N,N-dimethylformamide, N,N-dimethylacetamide, nitrobenzene, N-methylpyrrolidone, halogenated aliphatic or aromatic hydrocarbons such as trichloroethane, benzene or alkyl-, alkoxy- or halogen-substituted benzene, typically toluene, xylene, anisole or chlorobenzene; or aromatic N-heterocycles such as pyridine, picoline or quinoline. Preferred solvents are typically tetrahydrofuran, N,N-dimethylformamide, N-methylpyrrolidone. The cited solvents may also be used as mixtures. It is convenient to use 5–20 parts by weight of solvent to 1 part by weight of reactants.

The starting pigments of the perylenecarboximide, quinacridone, isoindoline, indigoid, azo, benzodipyrrolone, benzodifuranone, furanofuran, pyrrolo[2,5-b]pyrrole and bianthraquinone series are known pigments typically having the basic structures described above. Any that are novel can be prepared by standard known methods.

The compounds of formulae XII and XIII are known compounds which are commercially available.

The compounds of this invention are suitable for the mass colouration of high molecular weight organic material.

Depending on the nature of their substituents and of the polymers to be coloured, the compounds of this invention can be used as polymer-soluble chromophores for e.g. polystyrene, polyamides, ABS and, preferably, linear polyesters, or also as pigments for high-molecular weight organic material. Compared with the corresponding compounds containing only carboinyl groups, the compounds of this invention containing cyanimine groups are distinguished in particular by a surprisingly high solid-state fluorescence as well as by a coloristically interesting bathochromic change of shade.

Linear polyesters for the colouring of which the novel polymer-soluble compounds are particularly suitable are preferably those which are obtained by the polycondensation of terephthalic acid or the esters thereof with glycols of formula HO—$(CH_2)_n$—OH, wherein n is 2–10, or with 1,4-bis(hydroxymethyl)cyclohexane, or by polycondensation of glycol ethers of hydroxybenzoic acids, typically p-(β-hydroxyethoxy)benzoic acid. The term "linear polyester" also ermbraces copolyesters which are obtained by partial replacement of the glycol by another diol. The polyethylene terephthalates, however, are of particular interest.

The linear polyesters to be coloured are thoroughly blended with the colorant in the form of powders, chips or granules. This can be typically done by coating the polyester particles with the finely powdered dry colorant powder or by treating the polyester particles with a solution or dispersion of the colorant in an organic solvent and subsequently removing the solvent.

To adjust the shade, mixtures of the inventive compounds and also mixtures of one or more than one inventive compound with disperse dyes can be used.

Finally, the compounds of the invention can also be added direct to the polyester melt or also before or during the polycondensation of the polyethylene terephthalate.

Depending on the desired colour strength, the ratio of colorant to polyester can vary over a wide range. It is normally desirable to use 0.01–3 parts of colorant to 100 parts of polyester. The polyester particles so treated are fused by known methods in an extruder and compression moulded to objects, preferably sheets or filaments, or cast to boards.

For the utility as pigments, it is useful to convert the products obtained in the synthesis into a finely dispersed form. This can be done in a number of different ways, typically comprising:

a) By milling or kneading, conveniently in the presence of grinding assistants such as inorganic or organic salts with or without the addition of organic solvents. After milling, the assistants are removed in conventional manner: soluble inorganic salts e.g. with water and water-insoluble organic solvents e.g. by steam distillation.

b) By reprecipitation from sulfuric acid, methanesulfonic acid, trichloroacetic acid or polyphosphoric acid.

c) In the case of products in which R is hydrogen, by converting the crude pigment into an alkali salt or amine salt and hydrolysing this latter. This may be done by stirring the crude pigment with a base, suitably an alkali metal hydroxide or alcoholate, ammonia or an amine, in a polar organic solvent such as dimethyl formamide, whereupon the pigment dissolves wholly or partially. The pigment is precipitated by hydrolysis, preferably by acidifying the non-filtered or filtered solution.

d) It can be useful to subject the pigments treated according to a), b) or c) to an aftertreatment with an organic solvent, preferably with one that has a boiling point above 100° C.

Particularly suitable solvents are benzenes which are substituted by halogen atoms, alkyl or nitro groups, typically xylenes, chlorobenzene, o-dichlorobenzene or nitrobenzene, as well as pyridine bases such as pyridine, picoline or quinoline; and also ketones such as cyclohexanone; ethers such as ethylene glycol monomethyl or monoethyl ether; amides such as dimethyl formamide or N-methylpyrrolidone; and dimethyl sulfoxide, sulfolane or water alone, under normal or elevated pressure. The aftertreatment can also be carried out in water or in the presence of an organic solvent and/or with the addition of surfactants, or aliphatic amines or with liquid ammonia Depending on the envisaged end use, it is advantageous to use the pigments as obtained (toners) or in the form of preparations.

The high molecular weight organic material can be of natural or synthetic origin. It may typically comprise natural resins or drying oils, rubber or casein or modified natural substances such as chlorinated rubber, oil-modified alkyd resins, viscose, cellulose ethers and esters, including cellulose acetate, cellulose propionate, cellulose acetobutyrate or nitrocellulose, but preferably comprises man-made organic polymers (thermosetting resins and thermoplastic resins) obtained by polymerisation, polycondensation or polyaddition. Polymers of the class of polymerisation resins are in particular: polyolefins, typically polyethylene, polypropylene or polyisobutylene, and substituted polyolefins, including polymers of vinyl chloride, vinyl acetate, styrene, acetonitrile, acrylates and/or methacrylates or butadiene, as well as copolymers of the cited monomers, preferably ABS or EVA.

Polymers of the class of polyaddition resins and polycondensation resins are typically the condensates of formaldehyde with phenols, i.e. phenolic plastics, and the condensates of formaldehyde with urea, thiourea and melamine, i.e. aminoplastics, the polyesters used as surface-coating resins, viz. saturated polyesters such as alkyd resins, as well as unsaturated polyesters such as maleate resins, and also the linear polyesters, polycarbonates, polyurethanes and polyamides or silicones.

The aforementioned high molecular weight materials may be singly or in mixtures in the form of plastics materials or of melts which may be spun to fibres.

They may also be in the form of their monomers or in the polymerised state in dissolved form as film formers or binders for paints and vanishes or printing inks, for example boiled linseed oil, nitrocellulose, alkyd resins, melamine resins and urea/formaldehyde resins, or acrylic resins.

The pigmenting of the high molecular weight organic materials with the compounds of the invention is conveniently effected by incorporating such a pigment by itself or in the form of a masterbatch in the substrates using roll mills, mixing or milling apparatus. The pigmented material is then brought into the desired final form by methods which are known per se, conveniently by calendering, moulding, extruding, coating, casting or by injection moulding. It is often desirable to incorporate plasticisers into the high molecular weight compounds before processing in order to produce non-brittle mouldings or to diminish their brittleness. Suitable plasticisers are typically esters of phosphoric acid, phthalic acid or sebacic acid. The plasticisers may be incorporated before or after blending the pigments of this invention into the polymers. To obtain different shades it is also possible to add fillers or other chromophoric components such as white, coloured or black pigments in any amount to the high molecular weight organic materials in addition to the compounds of the invention.

For pigmenting paint systems and printing inks, the high molecular weight organic materials and the compounds of the invention, together with optional additives such as fillers, other pigments, siccatives or plasticisers, are finely dispersed or dissolved in a common organic solvent or mixture of solvents. The procedure may be such that the individual components by themselves, or also several components together, are dispersed or dissolved in the solvent and thereafter all the components are mixed.

The colorations obtained, typically in plastics, filaments, paint systems or printing inks, have a yellow to red shade, very high colour strength, high saturation, good dispersibility, good fastness to overspraying, migration, heat, light and weather, as well as good gloss and good IR remission. As already mentioned, very characteristic of the compounds of the invention is their surprisingly high solidsate fluorescence.

The compounds of the invention can also be used as toners for electrography and magnetography. They may also be used as colorants for printing inks, especially for ink jet printing and safety printing.

When the compounds of the invention are dissolved in the polymers employed, they are also distinguished by a pure hue, superior colour strength, good fastness properties, especially fastness to light and sublimation, and also by high fluorescence. They are suitable for use in solar energy collectors and for the induction of laser beams. Furthermore, they are very suitable for use as organic photoconductors for copying machines and laser printers as well as active components of electroluminescent elements.

The invention is illustrated by the following Examples.

EXAMPLE 1

A solution of 62.7 ml of bis(trimethylsilyl)carbodiimide in 175 ml of 1,2-dichlorobenzene is added, under nitrogen, to a solution of 30.4 ml of TiCl$_4$ in 175 ml of 1,2-dichlorobenzene. After 30 minutes, a mixture of 9.4 g of N,N'-dimethylquinacridone in 175 ml of 1,2-dichlorobenzene is added to the resultant red solution. The dark suspension is stirred for 72 hours at 60° C. and afterwards poured into 1 l of ice-water. The suspension so obtained is filtered, and the precipitate is washed with water and then with ethanol and dried in the air, affording 2.7 g (25% of theory) of a crystalline product of formula

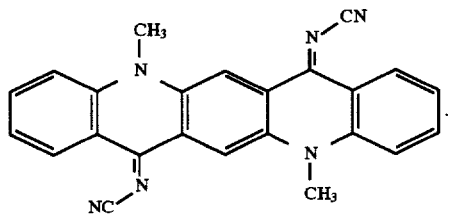

EXAMPLE 2

2.8 ml of bis(trimethylsilyl)carbodiimide are dissolved in 5 ml of 1,2-dichlorobenzene and this solution is added to a solution of 1.4 ml of TiCl$_4$ in 10 ml of 1,2-dichlorobenzene. The resultant red solution is stirred for 30 minutes at room temperature and then a suspension of 0.5 g of a pigment of formula

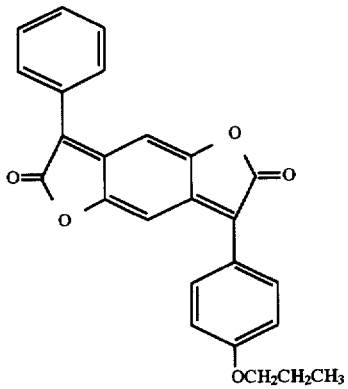

in 10 ml of 1,2-dichlorobenzene is added. The dark brown suspension is stirred for 20 hours at 60° C. and then diluted with 100 ml of water. The organic phase is collected and the solvent is removed under reduced pressure. The dark solid residue is suspended in 50 ml of water, the suspension is stirred for 1 hour at room temperature, filtered, and the filter product is washed with water and dried in a vacuum drying oven. The crude product is afterwards purified by column chromatography with ethyl acetate/hexane (1:9) as eluant, affording 0.153 g (27.3% of theory) of a violet product of formula

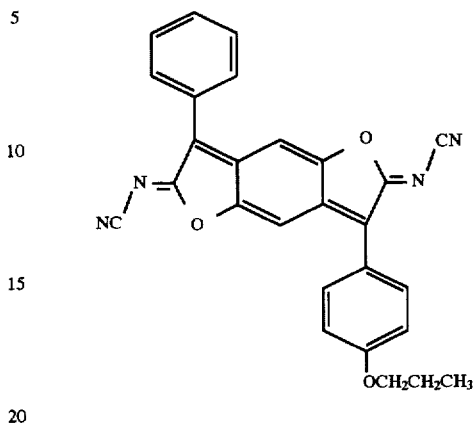

EXAMPLES 3–7

In accordance with the general procedures described in Examples 1 and 2, the following compounds are prepared starting from the corresponding oxo pigments:

Ex. No. 3:
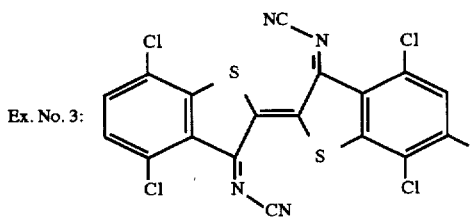

Ex. No. 4:
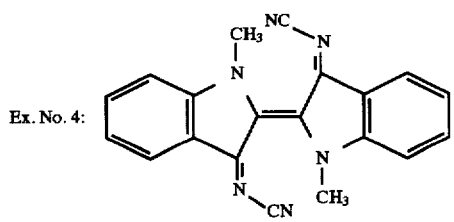

Ex. No. 5:
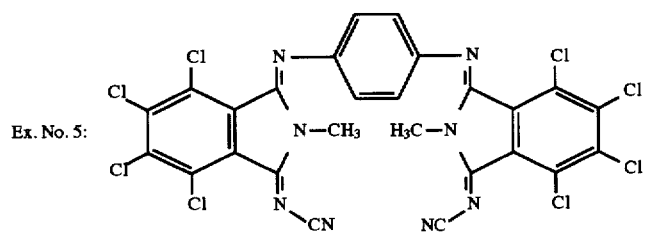

Ex. No. 6:
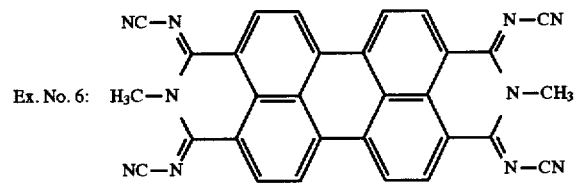

Ex. No. 7: 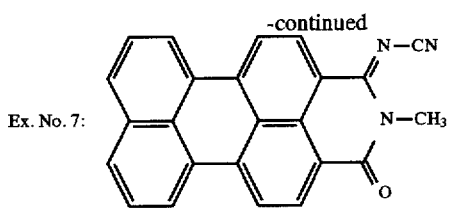

What is claimed is:

1. A compound selected from the series of (a) the azobenzimidazolone chromophores, (b) benzodipyrrolone chromophores, (c) pyrrolo[2.5-b]pyrroles of the formula

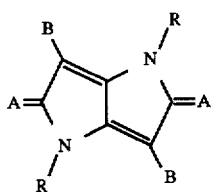 (X)

wherein B is a group of the formula

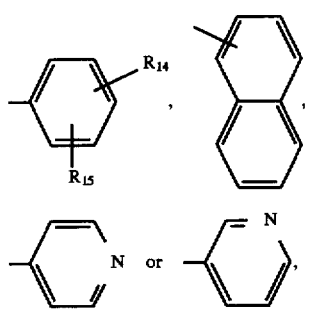

wherein $R_{14}$ and $R_{15}$ are each independently of the other hydrogen, chloro, bromo, $C_1-C_4$alkyl, $C_1-C_4$alkoxy, $C_1-C_6$alkylamino, CN or phenyl, said compound (a) (b) or (c) each containing at least one grouping of the formula

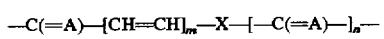 (I)

wherein each A may be N—CN or O, with the proviso that at least one A must be N—CN, X is N(R), R is hydrogen, $C_1-C_{18}$alkyl, unsubstituted or halogen- or $C_1-C_4$alkyl-substituted phenyl, benzyl or phenethyl, and m and n are each, independently of the other, 0 or 1, (d) indigo derivatives of the formulae

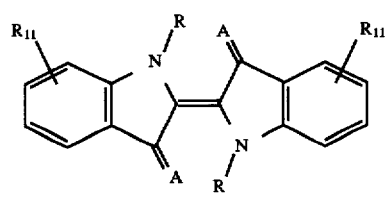 (VIa)

or

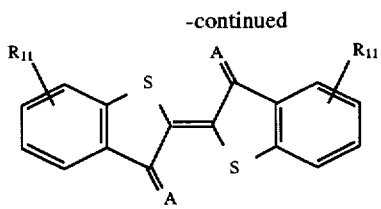 (VIb)

wherein $R_{11}$ is hydrogen, CN, $C_1-C_4$alkyl, $C_1-C_4$alkoxy or halogen, and A and R are as defined above, and (e) isoindolines of the formulae

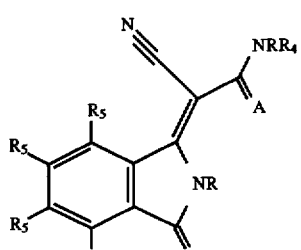 (IV)

or

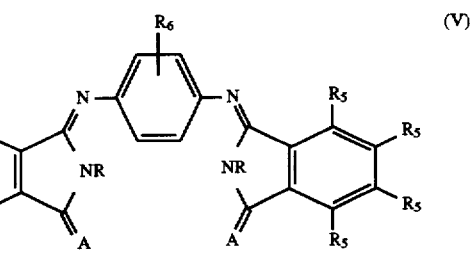 (V)

wherein $R_4$ is a group

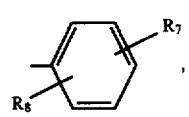

$R_5$ is hydrogen or chloro, $R_6$ is hydrogen, methyl or chloro, $R_7$, $R_8$, $R_9$ and $R_{10}$ are each independently of one another hydrogen, $C_1-C_{18}$alkyl, $C_1-C_4$alkoxy, halogen or trifluoromethyl, and A and R are as defined above.

2. A compound according to claim 1, which is an isoindoline of formula

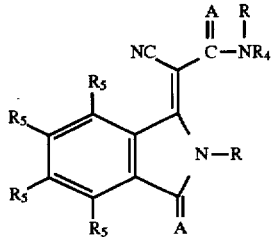

(IV)

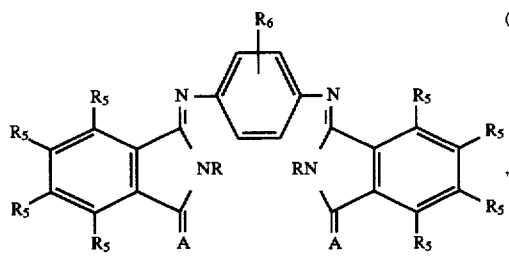

(V)

wherein R₄ is a group

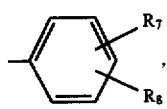

R₅ is hydrogen or chloro,

R₆ is hydrogen, methyl or chloro,

R₇, R₈, R₉ and R₁₀ are each independently of one another hydrogen, $C_1$–$C_{18}$alkyl, $C_1$–$C_4$alkoxy, halogen or trifluoromethyl, and A and R are as defined in claim 1.

3. A compound according to claim 1, which is an azobenzimidazolone of formula

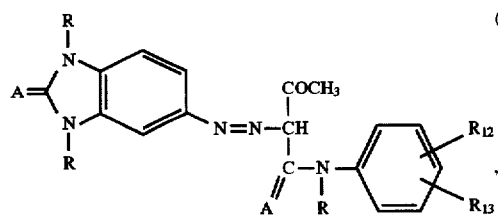

(VII)

wherein R₁₂ and R₁₃ are each independently of the other hydrogen, halogen, $C_1$–$C_4$alkyl or $C_1$–$C_4$alkoxy, and A and R are as defined in claim 1.

4. A compound according to claim 1, which is a benzodipyrrolone of formula

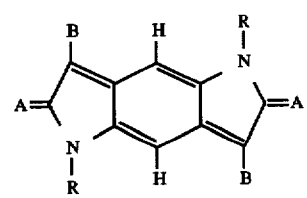

(VIIIa)

or

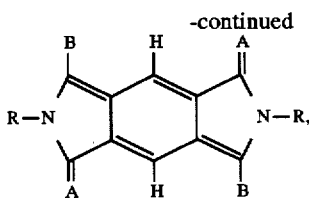

(VIIIb)

wherein B is a group of formula

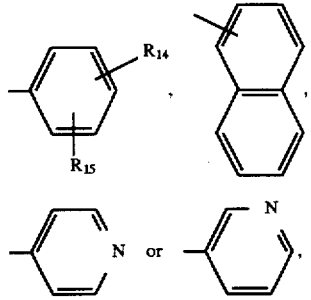

wherein R₁₄ and R₁₅ are each independently of the other hydrogen, chloro, bromo, $C_1$–$C_4$alkyl, $C_1$–$C_4$alkoxy, $C_1$–$C_6$alkylamino, CN or phenyl, and A and R are as defined in claim 1.

5. A process for the preparation of a compound as claimed in claim 1, which comprises reacting an insoluble compound selected from the series consisting of (a) the azobenzimidazolone and (b) benzodipyrrolones, (c) pyrrolo[2,5-b]pyrrole pigments of the formula (X)

wherein each A is N—CN or O, with the proviso that at least one A must be O, said compound (a) (b) or (c) each containing at least one grouping of the formula

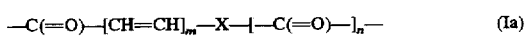

(Ia)

wherein X is N(R), R is hydrogen, $C_1$–$C_{18}$alkyl, unsubstituted or halogen- or $C_1$–$C_4$alkyl-substituted phenyl, benzyl or phenethyl, and m and n are each, independently of the other, 0 or 1, and (d) indigo derivatives of the formulae

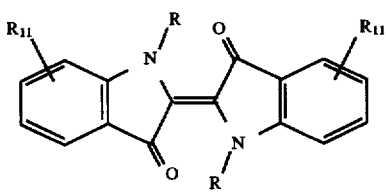

(VIa')

or

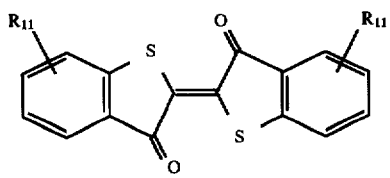

(VIb')

wherein R₁₁ is hydrogen, CN, $C_1$–$C_4$alkyl, $C_1$–$C_4$alkoxy or halogen, and (e) isoindolines of the formulae

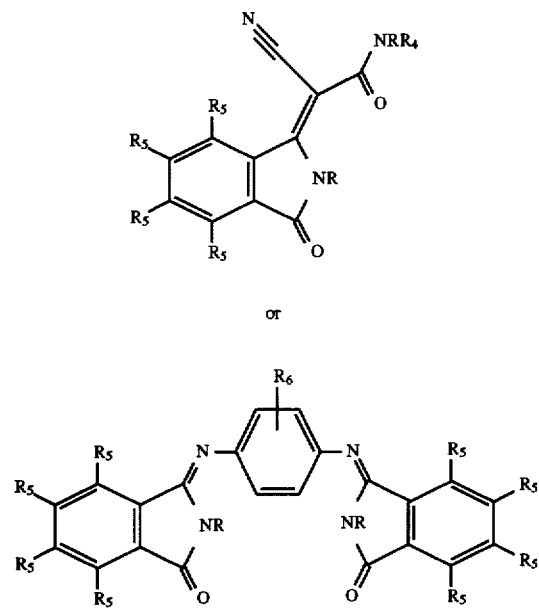

wherein $R_4$ is a group

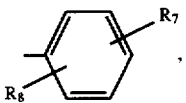

, $R_5$ is hydrogen or chloro.

$R_6$ is hydrogen, methyl or chloro.

$R_7$, $R_8$, $R_9$ and $R_{10}$ are each independently of one another hydrogen, $C_1$–$C_{18}$alkyl, $C_1$–$C_4$alkoxy, halogen or trifluoromethyl, in the desired molar ratio, with a compound of the formula $(R_{16})_3SiN=C=NSi(R_{16})_3$     (XII)

or $NH_2CN$     (XIII)

wherein $R_{16}$ is $C_1$–$C_6$alkyl, in the presence of a Lewis acid as catalyst and in an aprotic organic solvent, in the temperature range from 10° to 150° C.

6. Organic material of high molecular weight containing a compound as claimed in claim 1.

* * * * *